United States Patent [19]

Oda et al.

[11] Patent Number: 4,479,261
[45] Date of Patent: Oct. 23, 1984

[54] BATTERY SAVING CIRCUIT FOR PAGING RECEIVER

[75] Inventors: Takashi Oda; Takeshi Nakajima, both of Tokyo, Japan

[73] Assignee: NEC Corporation, Tokyo, Japan

[21] Appl. No.: 486,180

[22] Filed: Apr. 18, 1983

[30] Foreign Application Priority Data

Apr. 19, 1982 [JP] Japan .................................. 57-66021

[51] Int. Cl.³ .......................... H04B 1/16; H04B 5/04
[52] U.S. Cl. .................................... 455/343; 455/228; 340/825.44
[58] Field of Search ................. 455/227, 228, 38, 343; 340/825.44, 825.48, 311.1

[56] References Cited

U.S. PATENT DOCUMENTS 4,181,893  1/1980  Ehmke .................................. 455/343
4,194,153  3/1980  Masaki et al. ........................ 455/343

FOREIGN PATENT DOCUMENTS 2088604  6/1982  United Kingdom ................ 455/343

*Primary Examiner*—Jin F. Ng
*Attorney, Agent, or Firm*—Sughrue, Mion, Zinn, Macpeak, and Seas

[57] ABSTRACT

A battery saving circuit for a battery powered receiver composed of a receiving section, a waveform shaping section and a control section, the waveform shaping section requiring a predetermined time after being connected to the power supply to become operational. The battery saving circuit includes a calling signal detector, first and second timers responsive to the detector output and first and second switch circuits responsive to the first and second timers, respectively. The first and second times produce first and second switching signals, the second switching signal being produced the predetermined time after the first switching signal. The first switch circuit connects the waveform shaping section to the battery on receiving the first switching signal, while the second switch circuit connects the receiving section to the battery on receiving the second switching signal, whereby battery power is not supplied to the receiving section until the waveform shaping section has become operational.

10 Claims, 22 Drawing Figures

BATTERY SAVING CIRCUIT FOR PAGING RECEIVER

BACKGROUND OF THE INVENTION

The present invention relates to a battery saving circuit for use in a radio paging receiver or the like.

Battery saving circuits are generally employed for paging receivers in order to minimize power consumption. Such battery saving circuits function to selectively supply power to a receiver only during the time when selective calling signals of a group to which the receiver belongs are being transmitted and to cut the power supply during the time calling signals of other groups are being transmitted. One example of receivers including such a battery saving circuit is disclosed in U.S. Pat. No. 4,181,893 issued to E. L. Ehmke, Jan. 1, 1980.

A personal paging receiver includes a waveform-shaping circuit to provide rectangular waveform signals from received signals. The waveform-shaping circuit, in turn, includes a low-pass filter in order to obtain a reference voltage, and such a filter has a comparatively large time constant to stabilize the reference voltage. As a result, it takes a time equivalent to the time constant of the filter before the waveform-shaping circuit reaches normal operation. In the paging receiver, therefore, a battery saver circuit is started a time period, at least equal to the filter time constant, before the arrival of the selective calling signal of its own group. Such a battery saving circuit set at an earlier timing, however, is not desirable because, although it is effective for the waveform-shaping circuit, it consumes excessive power in other components of the pager receiver, thereby lowering the battery saving efficiency.

SUMMARY OF THE INVENTION

Accordingly, an object of the present invention is to provide a battery saving circuit for use in a personal paging receiver or the like which demonstrates a higher battery saving efficiency compared with conventional battery saving circuits.

According to the present invention, there is provided a receiver comprising power source means for supplying power to the receiver; receiver section means for receiving a carrier wave angle-modulated with a calling signal and demodulating it to provide a demodulated signal; waveform-shaping means for waveform-shaping the demodulated signal to provide a digital signal; memory means for storing a predetermined code in advance; control section means for detecting a call and thereby providing a detection signal in response to the digital signal and to said predetermined code, and for generating a first switching signal and a time delayed second switching signal delayed by a predetermined time from the first switching signal in response to the digital signal; first switching means connected between the waveform-shaping means and the power source means and responsive to the first switching signal for selectively supplying power from the power source to the waveform-shaping means; and second switching means connected between the receiver section means and the power source means and responsive to the second switching signal for selectively supplying power from the power source to the receiver section means.

BRIEF DESCRIPTION OF THE DRAWINGS

Other objects, features and advantages of the present invention will become clearer from the description hereinbelow with reference to the accompanying drawings, in which.

DESCRIPTION OF THE PRIOR ART

Figure 1:
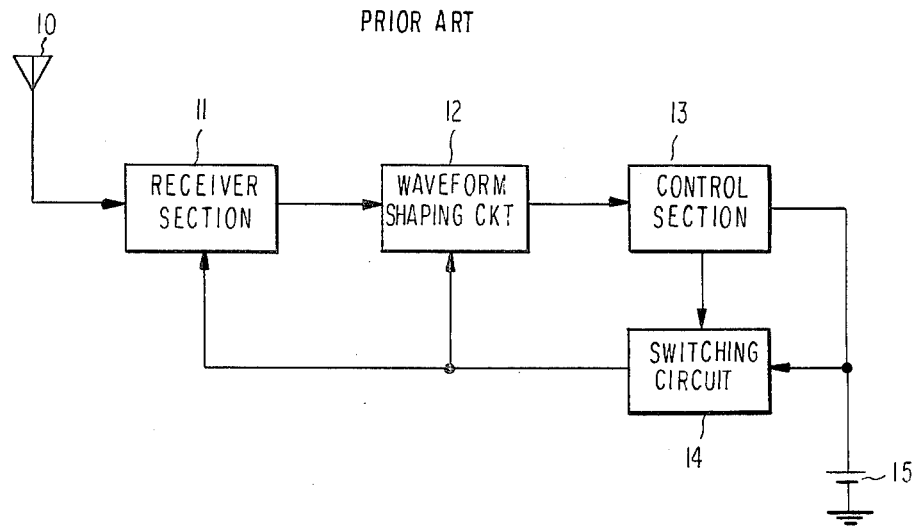
FIG. 1 is a block diagram of a radio paging receiver including a conventional battery saving circuit.

Referring to FIG. 1, a receiver section 11 converts a radio frequency (RF) signal picked up by an antenna 10 into a baseband signal and provides it to a waveform-shaping circuit 12. The waveform-shaping circuit 12 waveform-shapes the baseband signal into a binary digital signal and supplies the digital signal to a control section 13. In response to the digital signal, the control section 13 detects a synchronization signal and an address signal in the calling signal and generates an alarm signal and a control signal for battery saving. The battery saving control signal is supplied to a switching circuit 14 which, responsive thereto, selectively supplies power from a power source (battery) 15 to the receiver section 11 and to the waveform-shaping circuit 12 to attain a desired battery saving effect.

Figure 2:
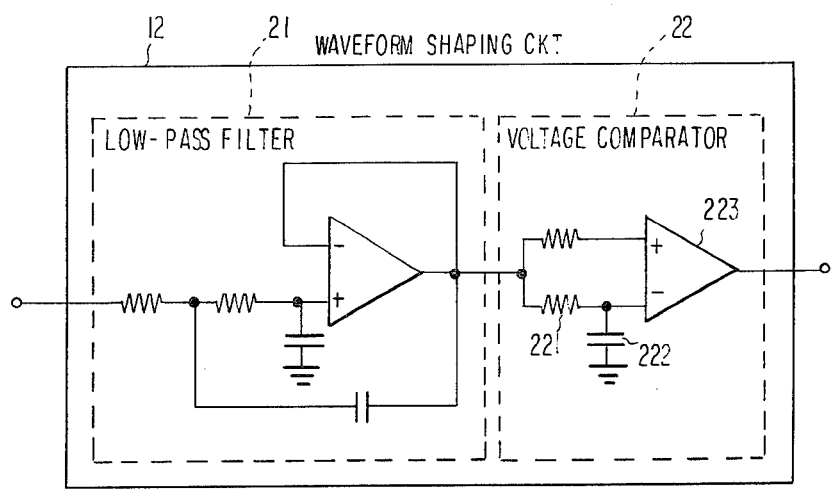
FIG. 2 shows a schematic circuit diagram of a typical example of a waveform-shaping circuit.

In FIG. 2, the waveform-shaping circuit 12 includes a low-pass filter 21 and a voltage comparator 22. The low-pass filter 21 is provided in order to improve the signal-to-noise (S/N) ratio of the baseband signal from the receiver section 11. The voltage comparator 22 compares the baseband signal with the reference voltage in an operational amplifier 223 to convert it into a digital signal.

Figure 3A:
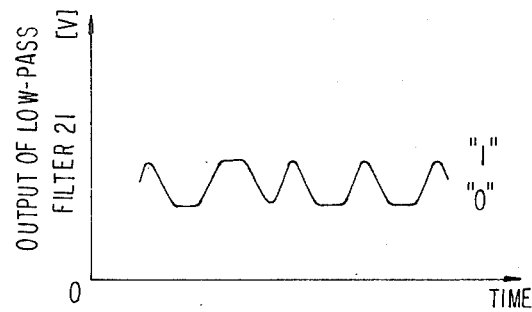
FIGS. 3A, 3B, 4, 5, 6A-6C, 7A-7D are graphs to explain the operation of the paging receiver shown in FIG. 1.
Figure 3B:
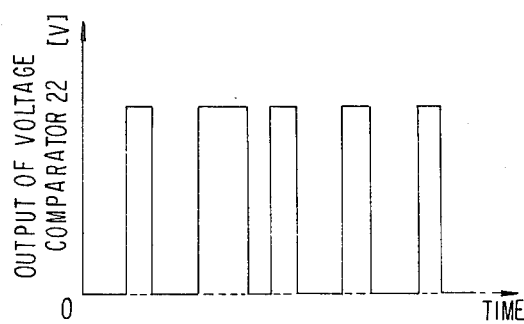
Figure 4:
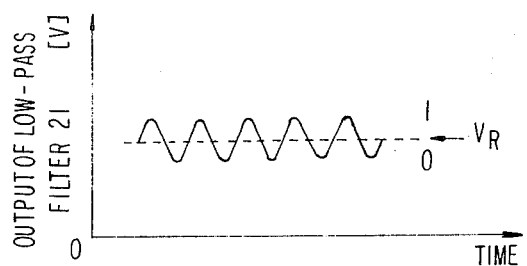
Figure 5:
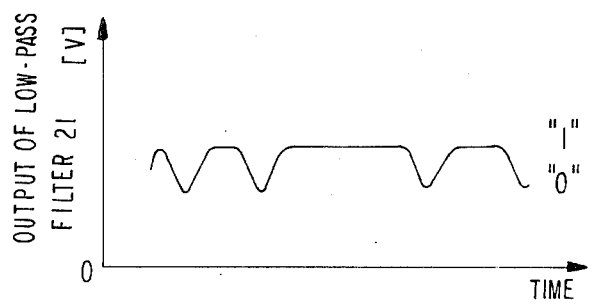

The operation of the waveform-shaping circuit 12 will be described in detail. When a radio carrier wave arrives at the receiver section 11 and the input electric field strength thereof becomes larger, the output waveform of the low-pass filter 21 may become, for instance, the one shown in FIG. 3A from which the comparator 22 provides a digital signal, as shown in FIG. 3B. The reference voltage of the comparator 22 is set by the combination of a resistor 221 and a capacitor 222 whose time constant decides the rise time of the reference voltage. The value of the time constant determines the average voltage $V_R$ of the output waveform of the low-pass filter 21 as shown in FIG. 4 in which the periodic ratio between the signals of logical "1" and "0" is around fifty percent. The time constant RC determinable by the resistance R of the resistor 221 and the capacitance C of the capacitor 222 is selected at a value large enough to make the reference voltage $V_R$ constant without being influenced even if the time ratio of signals deviates close to the logical "1", as shown in FIG. 5. If the time constant is set at such a large value, the information from the output waveform of the low-pass filter 21 is faithfully shaped into a digital signal of the logic level, after the reference voltage reaches a constant level.

Figure 6A:
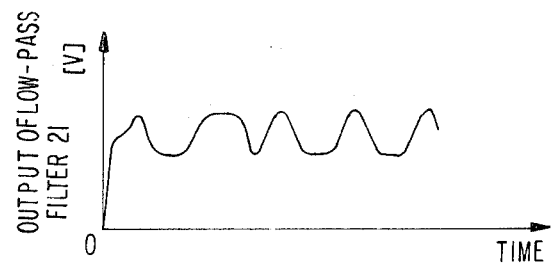
Figure 6B:
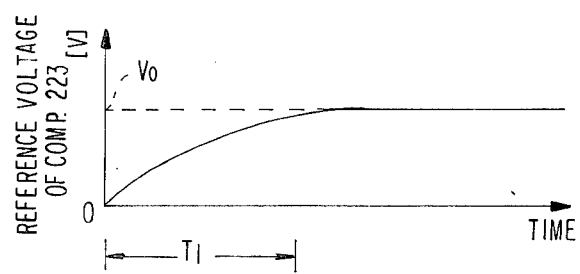
Figure 6C:
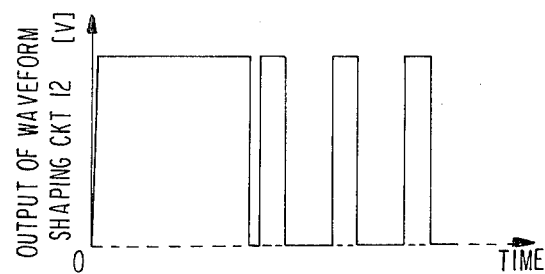
Figure 7A:
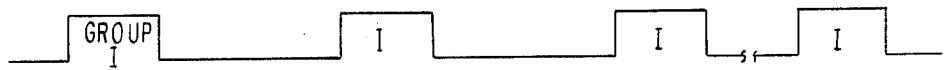
Figure 7B:
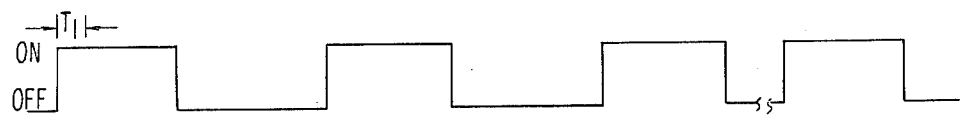
Figure 7C:
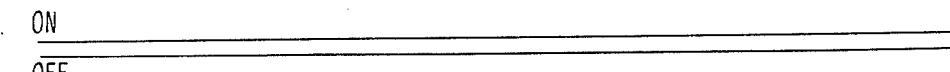
Figure 7D:
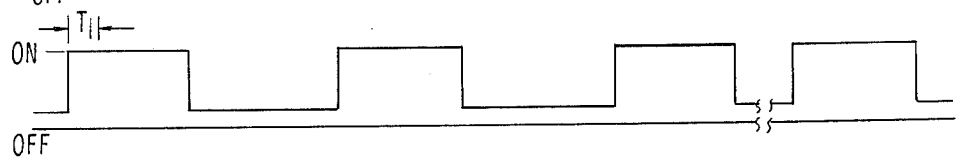

However, due to the significantly large time constant RC, turning on the receiver section 11 and the waveform-shaping circuit 12 to receive a radio carrier wave does not cause the input voltage on the reference voltage side of the comparator 223 to immediately reach the reference voltage $V_R$. It is only after the lapse of time $T_1$ (as shown in FIG. 6B) that the reference voltage $V_R$ is reached by the same input voltage. Because of the delay time $T_1$, the output waveform of the waveform-shaping circuit 12 becomes a digital signal shown in FIG. 6C during the time the output waveform of the low-pass filter 22 assumes the form as shown in FIG. 6A. Thus, no correct calling signal information can be obtained during the delay time $T_1$. When it is desired to receive the transmission signals of Group 1 as shown in FIG. 7A, therefore, the power source 15 of the receiver section 11 and the waveform-shaping circuit 12 must be operated at a time, at least equal to the delay time $T_1$, before Group 1 signals are received. For such transmitted signals shown in FIG. 7A, the power consumption of the whole receiver including the power consumed by the control section 13 in FIG. 7C will become the one shown in FIG. 7D. This reduces the effect of saving power consumption by battery saving.

DESCRIPTION OF THE PREFERRED EMBODIMENT

Figure 8:
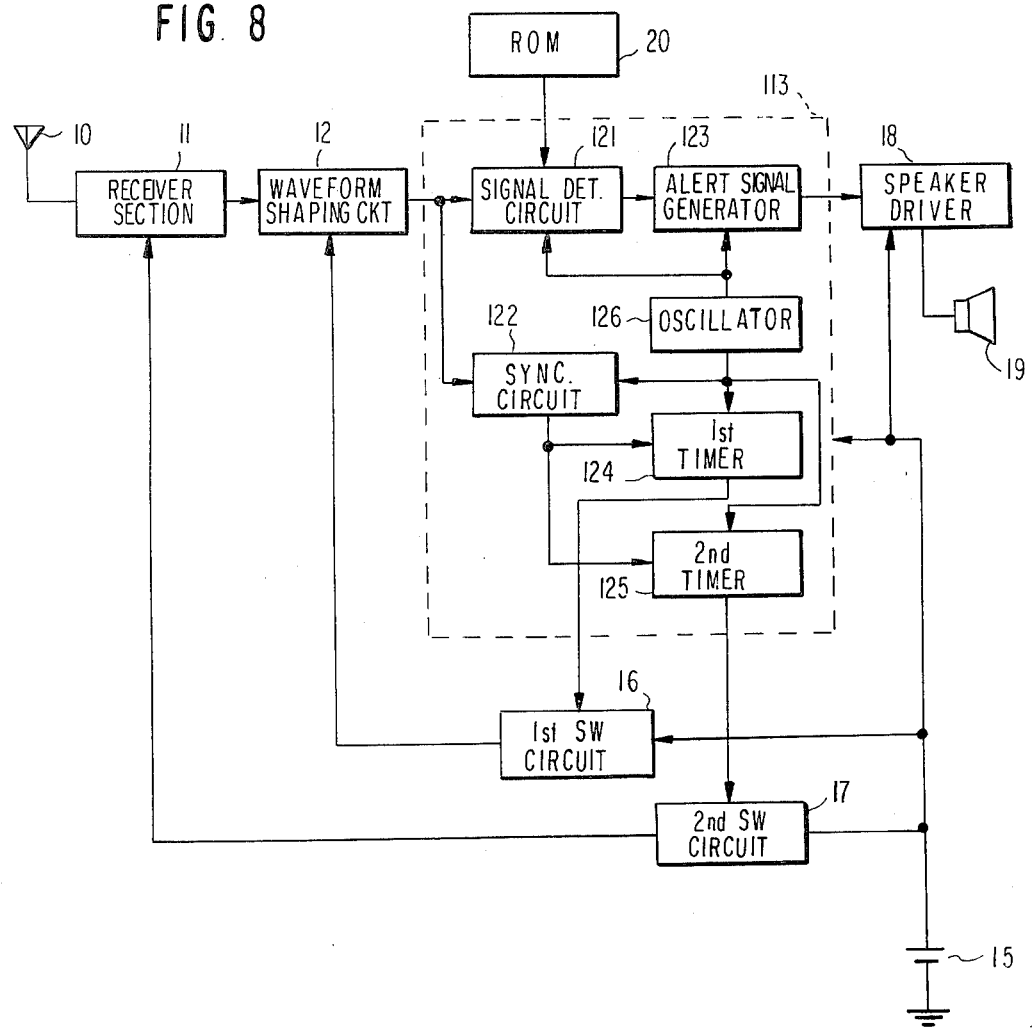
FIG. 8 shows a block diagram of a radio pager receiver including a battery saving circuit according to the present invention.

In FIG. 8, a receiving section 11 comprises a high frequency circuit, an intermediate frequency circuit and a discriminator etc., and converts a radio carrier wave picked up by an antenna 10 which has been phase- or frequency-modulated (i.e. angle-modulated) with a calling signal, into a baseband signal. A waveform-shaping circuit 12 shapes the waveform of the baseband signal to provide a digital signal to a control section 113.

The control section 113 is so constructed to direct the output from the waveform-shaping circuit 12 to a signal detection circuit 121 and a signal synchronization circuit 122. A read-only memory (ROM) 20 is connected to the signal detection circuit 121 whose output is applied to an alert signal generator 123 whose output in turn is applied to a speaker driver 18. The output from the signal synchronization circuit 122 is fed to timers 124 and 125, the outputs from these timers 124, 125 being respectively fed to the ON-OFF control inputs of switching circuits 16, 17. One of the outputs from an oscillator 126 is fed to the circuits 121 and 123 while the other output therefrom is fed to the synchronization circuit 122 and the timers 124 and 125, respectively.

Functions of those circuits will now be described hereinbelow. The signal detection circuit 121 compares the output digital signal of the waveform-shaping circuit with a calling signal which has been stored in advance in ROM 20. The alert signal generator 123 generates an intermittent audible tone in response to the output of the signal detection circuit 121. The signal synchronization circuit 122 generates bit and frame synchronization pulses from the digital signal converted by the waveform-shaping circuit 12. The timers 124 and 125 used for battery saving are activated by the synchronization pulses from the signal synchronization circuit 121. After the lapse of a predetermined time after the activation, the timers generate signals for battery saving control.

A loud-speaker 19 is connected to the driver circuit 18 which amplifies the alert signal generated by the alert signal generator 123 to a level sufficient to drive the speaker 19. The battery 15 is connected to the power source terminal of the control section 113, to the power source terminal of the waveform-shaping circuit 12 via a switching circuit 16 and to the power source terminal of the receiver section 11 via a switching circuit 17. The switching circuit 17 controls the power to be applied to the receiver section 11 under the control of the timer 125. The switching circuit 16 controls the power to be applied to the waveform-shaping circuit 12 under the control of the timer 124.

Figure 9A:
FIGS. 9A-9E and 10A-10C are graphs to explain the operation of the radio paging receiver shown in FIG. 8.
Figure 9B:
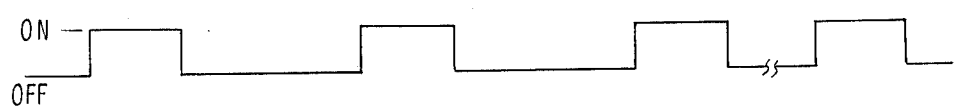
Figure 9C:
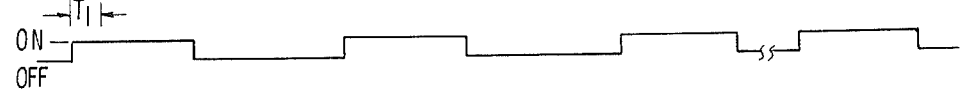

The baseband signal from the receiver section 11 is supplied to the waveform-shaping circuit 12 with which the baseband signal is converted to a binary digital signal. The signal synchronization circuit 121 generates a bit synchronization pulse from the converted digital signal and generates a group synchronization pulse by synchronizing with the group of calling signals to which the receiver belongs. The battery saving timer 124 receives the group synchronization pulse, counts the time Tw which is predetermined for the concerned paging system. After the predetermined time Tw expires, the timer 124 controls the switching circuit 16 so that the power from the battery 15 is applied to the waveform-shaping circuit 11. The time Tw is so selected that the power application to the waveform-shaper 11 starts at a time, earlier by $T_1$, than the time at which the Group I signals (see FIG. 9A) arrive, as shown in FIG. 9C. The time $T_1$ denotes the time of delay until the waveform-shaping circuit 12 begins to operate normally after the power source is connected thereto.

Figure 9D:
Figure 9E:
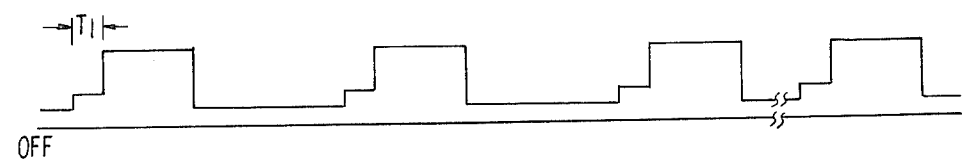

In a similar manner, the battery saving timer 125 receives the group synchronization pulse and counts a predetermined time $T_R$. After the lapse of the predetermined time $T_R$, the timer 125 transmits a control signal to switching circuit 17, so that power from battery 15 is applied to the receiver section 11. The predetermined time $T_R$ is so selected that the power application to the receiver section starts at substantially the same time as the group I arrives. Therefore, the total receiver power consumption including the control section 113 whose power consumption is shown in FIG. 9D, becomes as shown in FIG. 9E. In other words, the power consumption of the receiver section 11 which takes up almost all of the total consumption, is reduced by delaying its turn on signal by time $T_1$.

The power saving effect achieved according to the present invention will be demonstrated in terms of specific values by comparison with conventional devices.

Figure 10A:
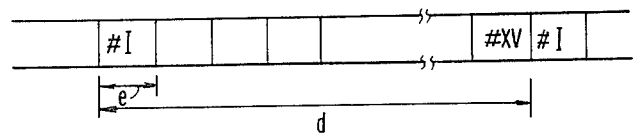
Figure 10B:
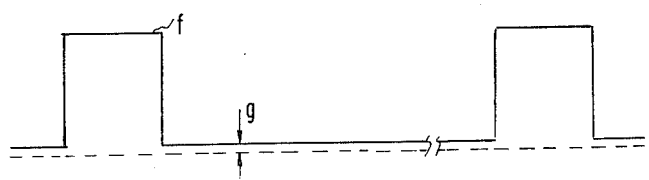
Figure 10C:
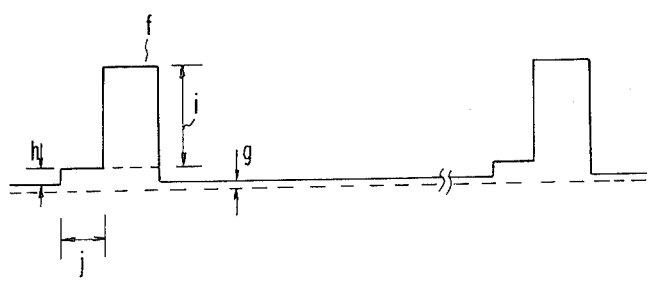

In FIG. 10A showing the structure of transmitted signals, the section d denotes transmitted signals of 15 groups while the section e that of the first group thereof. FIG. 10B shows power consumed by a receiver using a conventional battery saving circuit wherein the symbol f denotes the consumption of the whole receiver while g that of the control section. FIG. 10C illustrates the power consumption of a receiver using the battery saving circuit according to the present invention wherein the symbol h denotes the consumption of the waveform-shaping circuit, i that of the receiver section, and j the delay time $T_1$.

In practical values, for instance, it is assumed that the system has the signal transmission rate of 200 bits/sec., the transmission group d consists of 15 groups with 1 group consisting of 9 words (1395 ms) and 1 word of 31 bits (155 ms). If it is assumed that the consumption i of the receiver section is 5.29 mA, that h of the waveform-shaping circuit 200 μA, that g of the control section 10 μA and the delayed time $T_1$ 2 words (=310 ms), the average current $I_1$ of the conventional receiver can be expressed by the following formula;

$\bar{I}_1 \approx 0.457$ (mA)

and the average current $\bar{I}_2$ of the receiver embodying the present invention as;

$\bar{I}_2 \approx 0.378$ (mA).

This demonstrates about a 20% saving of the average power consumption in the receiver of the present invention, compared with the conventional one.

Although battery saving achieved by the timers activated by a pulse synchronized with a transmitted signal has been described in the foregoing, this invention is by no way limited to this embodiment. Similar power saving effects can be attained even if means other than the synchronization pulse is utilized simply by constructing them to apply power to the waveform-shaping circuit at a time at least equal to the time required for activating the waveform-shaping circuit, before the time power is applied to the receiver section.

The battery saver circuit according to the present invention as described above divides the receiver section from the waveform-shaping section so that the power can be supplied to the waveform-shaping circuit requiring a longer rise time by a predetermined time $T_1$ than that supplied to the receiver section. Therefore, the power consumption in the receiver section which takes up a larger portion of the total consumption of the portable receiver under ready-to-receive state is thereby reduced over the delay time $T_1$, remarkably extending the life of a battery.

What is claimed is:

1. A receiver comprising:
   power source means for supplying power to said receiver;
   receiver section means for receiving a carrier wave angle-modulated with a calling signal and demodulating it to provide a demodulated signal;
   waveform-shaping means for shaping the waveform of said demodulated signal to provide a digital signal; memory means for storing a predetermined code;
   control section means for detecting a call and thereby providing a detection signal, in response to said digital signal and to said predetermined code, and for generating in response to said digital signal a first switching signal and a second switching signal delayed by a predetermined time from the first switching signal;
   first switching means connected between said waveform-shaping means and said power source means and responsive to said first switching signal for selectively supplying power from said power source to said waveform-shaping means; and
   second switching means connected between said receiver section means and said power source means and responsive to said second switching signal for selectively supplying power from said power source to said receiver section means.

2. A receiver, as claimed in claim 1, further comprising annunciator means responsive to said detection signal for providing an alert signal.

3. A receiver, as claimed in claim 2, wherein said memory means includes a read-only memory.

4. A receiver, as claimed in claim 2, wherein said control section means comprises:

signal detection means for comparing said digital signal with said predetermined code and for providing a coincidence signal if they coincide;
   alert signal generator means responsive to said coincidence signal for supplying an alarm signal to said annunciator means as said detection signal; synchronizing means responsive to said digital signal for generating bit and frame synchronization pulses, and
   first and second timer means respectively having predetermined first and second timer times and responsive to said bit and frame synchronization pulses for carrying out timer operation, the difference between said predetermined first and second timer times being substantially equal to said predetermined time.

5. A receiver, as claimed in claim 4, wherein said waveform-shaping means includes:
   first filter means for filtering said demodulated signal;
   second filter means having a predetermined time constant for filtering the output of said first filter means to generate a reference voltage, said time constant being substantially equal to said predetermined time; and
   voltage comparator means for comparing the output voltage of said first filter means with said reference voltage to provide the resultant as the output of said waveform-shaping means.

6. A receiver, as claimed in claim 4, wherein said memory means includes a read-only memory.

7. A receiver, as claimed in claim 1, wherein said memory means includes a read-only memory.

8. A receiver, as claimed in claim 1, wherein said waveform-shaping means includes:
   first filter means for filtering said demodulated signal;
   second filter means having a predetermined time constant for filtering the output of said first filter means to generate a reference voltage, said time constant being substantially equal to said predetermined time; and
   voltage comparator means for comparing the output voltage of said first filter means with said reference voltage to provide the resultant as the output of said waveform-shaping means.

9. A receiver, as claimed in claim 8, wherein said memory means includes a read-only memory.

10. A battery operated receiver including a receiving section and a waveform shaping section coupled to said receiving section for receiving a carrier modulated with a calling signal, said waveform shaping section requiring a predetermined time after the application of power to achieve operating status, a battery saving circuit comprising:
    means for detecting said calling signal from said waveform shaping section and for producing a detection signal in response to said calling signal;
    first timer means for producing a first switching signal in response to said detection signal;
    second timer means for producing a second switching signal, delayed from said first switching signal by said predetermined time, in response to said detection signal;
    means responsive to said first switching signal for applying power from said battery to said waveform shaping section; and
    means responsive to said second switching signal for applying power from said battery to said receiving section.

* * * * *